US011981148B2

(12) United States Patent
De Miranda

(10) Patent No.: US 11,981,148 B2
(45) Date of Patent: May 14, 2024

(54) WEAR COMPENSATION DEVICE OF A LABEL PRINTER

(71) Applicant: Espera-Werke GmbH, Duisburg (DE)

(72) Inventor: Guillaume De Miranda, Velden (NL)

(73) Assignee: Espera-Werke GmbH, Duisburg (DE)

( * ) Notice: Subject to any disclaimer, the term of this patent is extended or adjusted under 35 U.S.C. 154(b) by 763 days.

(21) Appl. No.: 16/979,060

(22) PCT Filed: Feb. 26, 2019

(86) PCT No.: PCT/EP2019/054688
§ 371 (c)(1),
(2) Date: Oct. 7, 2020

(87) PCT Pub. No.: WO2019/174904
PCT Pub. Date: Sep. 19, 2019

(65) Prior Publication Data

US 2023/0202197 A1 Jun. 29, 2023

(30) Foreign Application Priority Data

Mar. 16, 2018 (DE) ..................... 10 2018 106 240.0

(51) Int. Cl.
*B41J 2/355* (2006.01)
*B41J 3/407* (2006.01)

(52) U.S. Cl.
CPC ........... *B41J 2/3553* (2013.01); *B41J 3/4075* (2013.01)

(58) Field of Classification Search
CPC . B41J 2/3553; B41J 3/4075; B41J 2/36; B41J 2/32
See application file for complete search history.

(56) References Cited

U.S. PATENT DOCUMENTS

| | | | |
|---|---|---|---|
| 4,573,058 A | 2/1986 | Brooks |
| 5,172,137 A | 12/1992 | Hongo et al. |
| 5,324,121 A | 6/1994 | Sasaki et al. |
| 5,608,442 A | 3/1997 | Bennefeld et al. |
| 2018/0297376 A1 | 10/2018 | Vicktorius et al. |

FOREIGN PATENT DOCUMENTS

| | | |
|---|---|---|
| DE | 3820927 A1 | 1/1989 |
| DE | 4139445 A1 | 6/1992 |
| DE | 4302652 A1 | 8/1993 |
| DE | 102015118732 A1 | 5/2017 |

OTHER PUBLICATIONS

International Search Report dated Jun. 5, 2019 filed in PCT/EP2019/054688.

*Primary Examiner* — Lisa Solomon
(74) *Attorney, Agent, or Firm* — Rankin, Hill & Clark LLP

(57) ABSTRACT

The invention relates to a wear compensation device (1) of a label printer (2) which prints labels (3) by means of thermal printing, having a thermal head (4) which has a thermal strip (5) with a plurality of heating resistors (6), having a label feeding device (8) which feeds the respective label (3) to the active region (9) of the heating resistors (6), and having a control device (10) which actuates the thermal head (4) for printing the respective label (3). It is proposed that the control device (10) is configured to monitor the electric resistance (R) of one or more of the heating resistors (6) and, if a predefined threshold value (R1) for the electric resistance (R) is exceeded, to increase the energization duration of the respective heating resistor (6) during a printing operation.

20 Claims, 3 Drawing Sheets

WEAR COMPENSATION DEVICE OF A LABEL PRINTER

Figure 1:
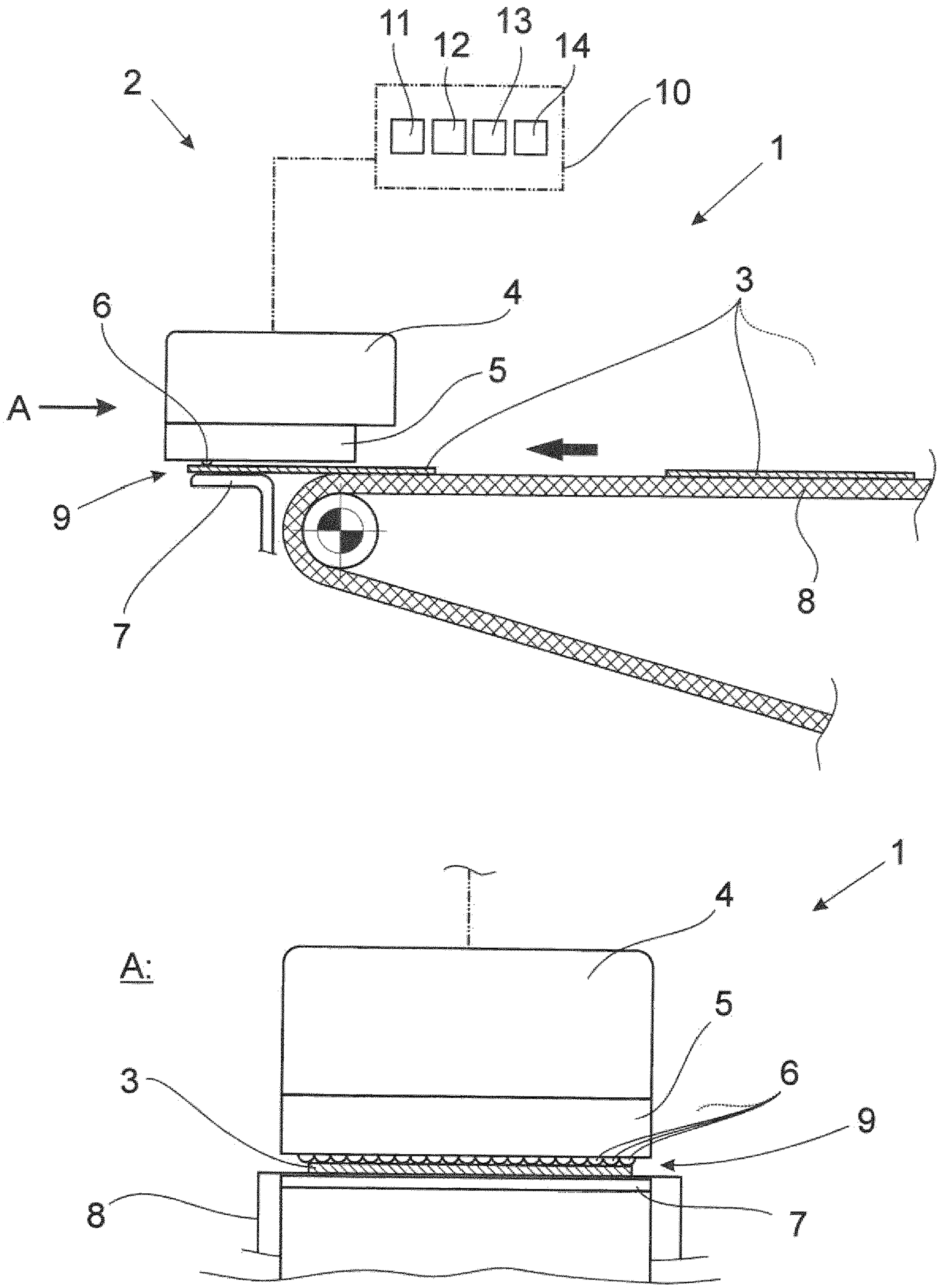

The present invention relates to a wear compensation device of a label printer according to the preamble of claim 1 and to a method for wear compensation of a label printer according to the preamble of claim 12.

Different label printers and methods for printing labels are known from the prior art. The labels, in particular product labels, are either self-adhesive labels detachably arranged on a carrier strip or carrier-free labels (liner-less labels), which are provided as a continuous strand and separated by being cut off. The individual labels or the continuous strand are/is then fed into a print head which provides the labels with an imprint which, for example, comprises price and/or weight information relating to a product. The printed labels are then removed from the print head and affixed to an article, in particular a product.

The print head of such a label printer can be configured in different ways. Besides an inkjet or laser print head, it can also be configured as a thermal print head, a thermal head for short below. The latter prints labels by means of thermal printing. Thermal printing designates a technique in which a thermosensitive medium is changed in color, in particular blackened, by a point-like input of heat at the location of the heat action. The point-like heat action is effected by one or more rows of small heating resistors, which are arranged in the thermal strip of the thermal head. Each heating resistor, also called a dot, can be activated and heated individually.

A distinction is drawn in thermal printing between direct thermal printing, thermal transfer printing and thermal sublimation printing. In direct thermal printing, a thermosensitive paper is blackened directly by a point-like heat action at the location of the input of heat. Special paper for direct thermal printing, which produces different colors at the location of the input of heat with a differently intense input of heat, is also known. In thermal transfer printing, the paper to be printed is not led directly past the thermal strip, instead the paper is led past the thermal strip together with a special film (transfer film), the transfer film being arranged between the paper and the thermal strip. As a result of the point-like heat action, the colored layer located on the transfer film melts in the region of the input of heat and is picked up by the adjacent paper. Also in thermal sublimation printing, a transfer film is arranged between the paper to be printed and the thermal strip. As a result of the point-like input of heat, the colored layer on the transfer film does not melt here, instead the colorant changes to the gaseous state and is picked up by the adjacent paper.

A known problem in thermal printing is that the heating resistors age over the course of time. The ageing process is associated with an increase in the electric resistance of the heating resistor or resistors, which means that less heat is produced (with the same current intensity and/or voltage). The consequence is an impairment of the imprint quality on the printed labels. It is therefore necessary to replace the thermal strip after a certain operating period, for example after an average increase in the electric resistance of all the heating resistors by 15% as compared with the initial value, i.e. the value when the thermal strip is first put into service. Such a replacement causes undesired stoppage times of the label printer and a corresponding labeling device and leads to an increase in the operating costs.

To counteract a wear-induced (ageing-induced) rise in the electric resistance of the heating resistors and a resultant impairment of the imprint quality on the printed labels, it is known from the prior art (DE 10 2015 118 732 A1), traced back to the applicant, to increase the contact force with which the respective label is pressed against the thermal strip during the printing operation over the course of time. In this way, the effect of the wear of the heating resistors can be counteracted up to a certain level. In order to adapt the contact force appropriately, the thermal head and a mating printing element, which presses from below in the direction of the thermal strip, are each movably mounted.

The invention is based on the problem of providing a wear compensation device which, in the simplest possible way, counteracts the effects of age-induced wear and associated impairment of the imprint quality on printed labels.

In a wear compensation device of a label printer according to the preamble of claim 1, the above problem is solved by the features of the characterizing part of claim 1.

In detail, it is proposed that the control device which activates the thermal head for printing the respective label is configured to monitor the electric resistance of one or more of the heating resistors and, if a predefined threshold value for the electric resistance is exceeded, to increase the energization duration of the respective heating resistor during a printing operation. As a result of the increase in the energization duration, the respective heating resistor can discharge correspondingly more energy to the thermosensitive medium of the label to be printed, as a result of which a wear-induced reduction in the color change effected by the respective heating resistor, in particular blackening, can be counteracted.

What is important is the basic consideration of compensating for age-induced wear of the thermal strip and the effects of said wear by increasing the energization duration of the respective heating resistor. Thus, at least beginning from a specific time during the service life of a thermal strip, the electric resistance of the heating resistors increases as a result of ageing, as a result of which sufficient thermal energy is longer introduced into the thermosensitive medium during the standard energization duration. However, if thermal energy is produced at the location of the heat action over a lengthened time period, that is to say the time of action of the heat is lengthened, the thermosensitive medium can be changed in color correspondingly more intensely, in particular blackened. The more intense color change or blackening of the thermosensitive medium is in particular not based solely on the lengthened time of action but also on more intense heating of the heating resistor on the basis of the longer energization. It is consciously accepted that the respective heating resistor is stressed correspondingly more intensely starting at the time of the increase in the energization duration, and correspondingly changes more quickly. By contrast, however, the imprint quality can be kept at an acceptable level for longer, as a result of which the thermal strip can overall be operated for a longer time. The thermal strip can then be replaced at a later time than in the normal case, which reduces the operating costs overall.

According to the configuration according to claim 2, the resistance of all the heating resistors of the thermal strip is preferably monitored. However, it is also conceivable to monitor only some of the heating resistors. Thus, the electric resistance of heating resistors of at least a predefined group of heating resistors of the thermal strip can also be monitored. The group of heating resistors comprises, for example, those heating resistors which are particularly stressed, since they are energized particularly frequently as standard, and are thus particularly susceptible to wear.

According to the configuration according to claim 3, the voltage and/or the current intensity during the printing operation with the increased energization duration is preferably not changed. In principle, however, as an additional compensation measure, an increase in voltage and/or current intensity can also be provided.

According to the configuration according to claim 4, the electric resistance of the respective heating resistor is preferably determined continuously, i.e. each time it is switched on. However, the electric resistance can also be determined at time intervals, in particular at regular time intervals or whenever a printing pause is imminent. For example, this can be done regularly during each thousandth switch-on or once or several times per day.

Claims 5 and 6 define special configurations of the control device. These can have, for example, a current and/or a voltage measuring device for determining the respective electric resistance (claim 5) and/or a comparator for comparing the respectively determined electric resistance or resistance value with the predefined threshold value (claim 6). Depending on the result of the comparison, the energization duration can then be adjusted, i.e. if the predefined threshold value has not been exceeded, the energization duration is not changed, or if the predefined threshold value has been exceeded, the energization duration is increased as described previously.

According to the configuration according to claim 7, the energization duration is adjusted depending on the respectively determined electric resistance of the respective heating resistor, the energization duration in particular rising linearly or exponentially, in particular with increasing electric resistance. How highly the energization duration is increased with increasing electric resistance can be determined by the control device, in particular by using stored characteristic curves or characteristic maps.

To store such characteristic curves or characteristic maps and/or to store threshold values for the electric resistance and/or to store respectively determined resistance values for the electric resistance, the control device can have a memory. In particular, the control device has a memory in which the threshold value is stored, wherein an individual threshold value is stored preferably for each monitored heating resistor, or a common threshold value is stored for all the monitored heating resistors or a common threshold value is respectively stored for at least a group of monitored heating resistors (claim 8).

According to the configuration according to claim 9, provision can also be made for the respective threshold value to remain constant or to be adapted over the course of time, in particular raised. Thus, provision can be made for the control device to carry out the monitoring initially on the basis of an initial value for the threshold value and for this threshold value to be maintained or taken into account until the latter has been exceeded for the first time. As a result of the value being exceeded, a new threshold value is generated, which replaces the previous threshold value and is in particular stored in the memory. The previous threshold value is therefore then overwritten. The energization duration adjusted on the basis of exceeding the previous threshold value is then maintained and not increased until the new threshold value has been exceeded for the first time. In principle, however, it may also be advantageous not to change the originally provided threshold value, i.e. the initial value, and then, after the same has been exceeded, always to adjust the energization duration depending on the respectively determined electric resistance.

According to the configuration according to claim 10, the control device itself can fix a threshold value for the electric resistance of the respective heating resistor when a new thermal strip has been installed. Thus, the heating resistors are always different because of production-based tolerances, even in a new thermal strip, so it may be advantageous to fix an individual threshold value for each heating resistor of the thermal strip. The control device can carry this out fully automatically, i.e. it automatically detects the presence of a new thermal strip and then, without an operator having to act, fixes the threshold value or values. Semi-automatic fixing of the threshold values is also conceivable, i.e. after a new thermal strip has been installed, an operator starts a routine, which the control device then executes automatically in order to fix the threshold value or values.

According to the configuration according to claim 11, the threshold value, in particular the initial value, is in particular 1 to 20%, preferably 1 to 10%, particularly preferably 1 to 5%, higher than the initial value for the electric resistance of the respective heating resistor or than the average initial value of all the monitored heating resistors. The initial value means the resistance value the first time the thermal strip is put into operation. It is therefore possible for an individual threshold value to be fixed for each monitored heating resistor, or a common threshold value can be fixed for multiple monitored heating resistors. The energization duration is preferably then adjusted individually for each monitored heating resistor. In principle, however, provision can also be made to increase the energization duration of all the heating resistors of a group of monitored heating resistors by the same amount or percentage if only one of the heating resistors of this group exceeds a threshold value predefined for the group with its electric resistance.

According to the further teaching according to claim 12, which is independently important, a method is claimed for wear compensation of a label printer which prints labels by means of thermal printing, for example by means of direct thermal printing, thermal transfer printing or thermal sublimation printing. In the method, which in particular can be carried out by using a wear compensation device as defined previously, it is important that the electric resistance of one or more of the heating resistors of a thermal strip of a thermal head of the label printer is monitored and, when a predefined threshold value for the electric resistance is exceeded, the energization duration of the respective heating resistor is increased during the printing operation. The same advantages as described previously in conjunction with the wear compensation device result.

Figure 2:
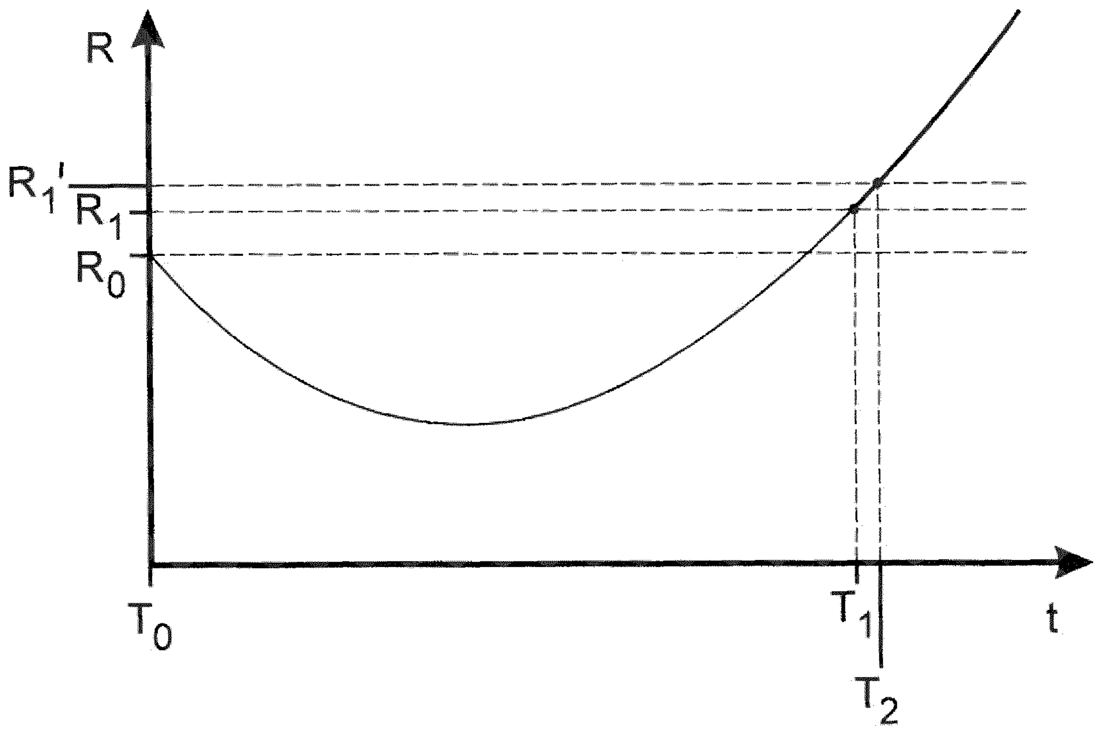
Figure 3:
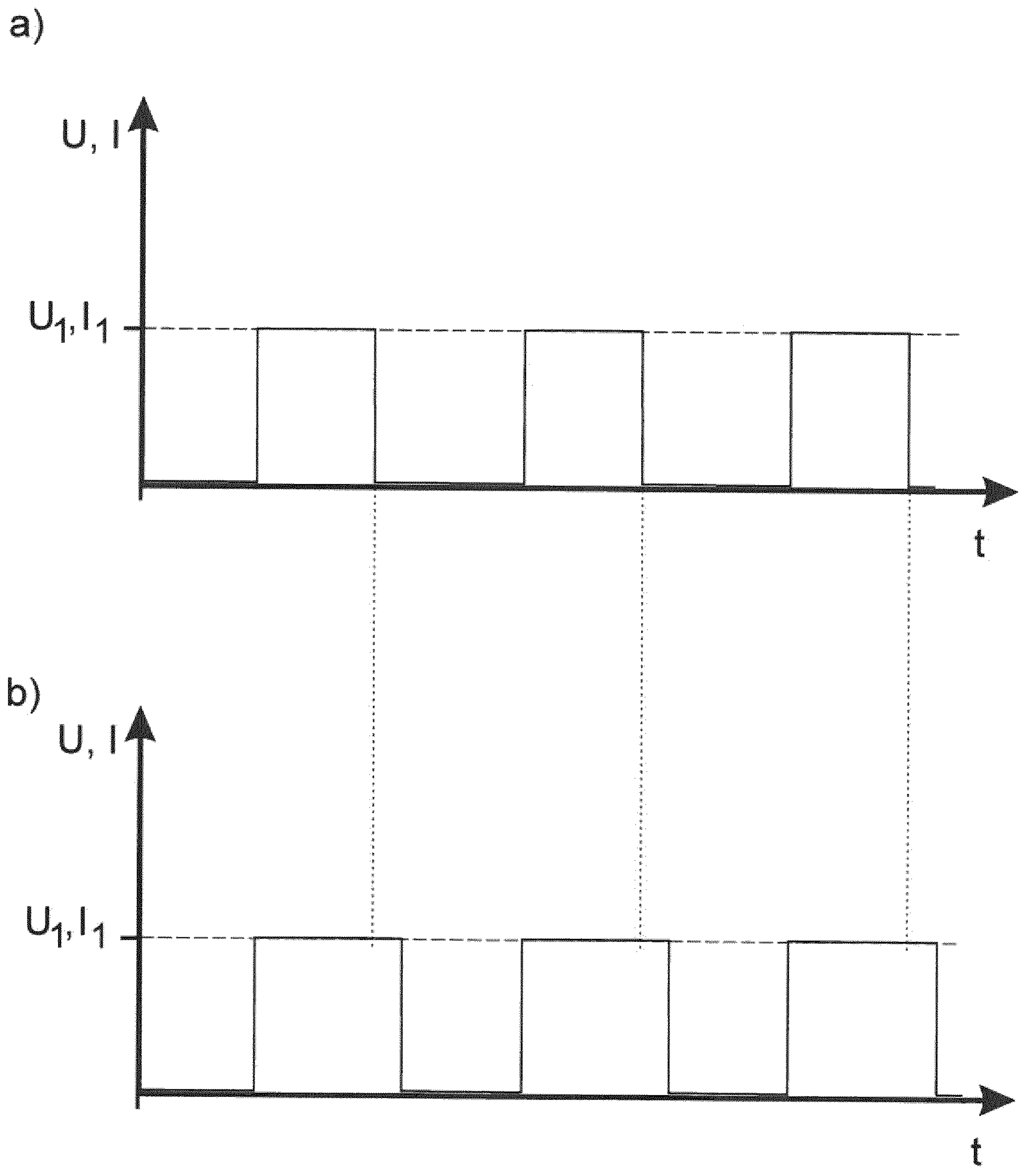

The invention will be explained in more detail below by using a drawing, merely illustrating an exemplary embodiment. In the drawing:

FIG. 1 shows a schematic view of a wear compensation device as proposed from the side and from the front, FIG. 2 shows an example of the curve of the electric resistance of a heating resistor over its service life and FIG. 3 shows the energization of the heating resistor a) until a threshold value for the electric resistance is reached, and b) after the threshold value for the electric resistance has been exceeded.

The wear compensation device 1 shown in FIG. 1 in the two views is a constituent part of a label printer 2, which prints labels 3 by means of thermal printing, for example by means of direct thermal printing. The labels 3 here are self-adhesive labels 3, for example, which are detachably arranged on a carrier strip (not illustrated) and are printed individually following the detachment.

For the printing, a thermal head 4 is provided, which has a thermal strip 5 with a multiplicity of heating resistors (dots) 6, via which a printed image of a specific imprint quality is produced on the surface of the respective label 3, which is led past the thermal strip 5.

On the side opposite the thermal strip 5, i.e. vertically underneath the label 3 which is just being printed here, there is arranged a mating printing element 7, which here and preferably is designed as a pressure-felt-coated strip. In principle, the mating printing element 7 can also be an impression cylinder.

Furthermore, a label feed device 8, here and preferably in the form of a transport belt, is provided, which feeds the respective label 3 to the active region 9 of the heating resistors 6. Here and preferably, the labels 3 are fed to the active region after they have been separated or detached from a carrier strip. However, it is also conceivable to feed the labels 3 while they are still located on the carrier strip. The active region means the portion underneath the thermal strip 5, in which the heating resistors 6 can introduce thermal energy point by point into the thermosensitive medium of the label 3 and, as a result, can effect a color change, in particular blackening, of the label 3 at this point.

The wear compensation device 1 as proposed further has a control device 10, which activates the thermal head 4 for printing the respective label 3.

The activation of the thermal head 4 comprises the energization of the respective heating resistors 6 for predefined energization duration.

It is then essential that the control device 10 as proposed monitors the electric resistance R of one or more of the heating resistors 6, here all of the heating resistors 6 of the thermal strip 5. The monitoring comprises the repeated determination of the electric resistance R of the respective heating resistor 6. When a predefined threshold value $R_1$ for the electric resistance R is exceeded, the control device 10 then increases the energization duration of the respective heating resistor 6. The respective heating resistor 6 is also energized for longer as compared with the initially provided energization duration and is thus activated for longer. Therefore, the respective heating resistor 6 can act for longer on the thermosensitive medium of the label 3 and bring about a more intense color change or blackening. Ageing-induced retrogression of the level of color change or level of blackening can therefore be compensated.

The control device 10 is here and preferably configured such that the voltage U and/or current intensity I are/is not changed during the printing operation carried out with the increased energization duration. In other words, the voltage U and/or current intensity I remain unchanged in comparison with at least the last preceding printing operation in which the threshold value $R_1$ had not yet been exceeded or in comparison with all the preceding printing operations in which the threshold value $R_1$ had not yet been exceeded, here according to FIG. 3 at a value $U_1$ or $I_1$. In principle, however, as an additional compensation measure in order to compensate for a decreasing level of color change or level of blackening, the voltage U and/or current intensity I of the respective heating resistor 6 can be increased.

Here and preferably, the electric resistance R of the respective heating resistor 6 is determined continuously, i.e. each time it is switched on. Here, the electric resistance R is determined via a current measuring device 11 and/or a voltage measuring device 12.

The control device 10 further has a comparator 13, which compares the respectively determined electric resistance or the corresponding resistance value R of the respective heating resistor 6 with the predefined threshold value $R_1$. Thus, FIG. 2 shows by way of example a curve of the electric resistance or resistance value R of one of the heating resistors 6 of the thermal strip 5. Thus, the heating resistor 6 has an electric resistance $R_0$ at the start of its service life (time $T_0$). The electric resistance R then initially falls as a result of a large number of printing operations in the course of the service life of the heating resistor 6 and then rises again. As FIG. 2 shows, the electric resistance R exceeds its initial value $R_0$ at some point and continues to rise. As soon as a predefined threshold value $R_1$ for the electric resistance R is exceeded at a specific time $T_1$, the control device 10 changes the energization duration of this heating resistor 6.

In the exemplary embodiment illustrated in FIG. 2, the threshold value $R_1$ lies above the initial value $R_0$ of the heating resistor 6, which has the advantage that the increase of the energization duration is performed only when the heating resistor 6 has actually reached a specific level of wear over the course of time. As a result, it is possible to rule out the energization duration also already being increased at the start when the thermal strip 5 or the heating resistor 6 is still new, but where it also has an electric resistance R with a value of $R_0$ later in the critical state.

In principle, however, it is also conceivable to fix the threshold value $R_1$ at the initial value $R_0$ of the heating resistor 6, wherein the control device 10 is able to distinguish the initial state of the heating resistor 6, in which the energization duration is not yet to be increased, from the critical state, starting from which the energization duration is to be increased, by using a series of resistance values stored over the course of time, wherein it is possible to draw conclusions about a rise in the electric resistance R by comparing at least two successive resistance values. If the value $R_0$ is then reached, the control device 10 detects that the critical state which requires an increase in the energization duration has been reached.

The energization duration is adjusted as proposed depending on the respectively determined electric resistance R of the respective heating resistor 6, the energization duration rising with increasing electric resistance R. In FIG. 3*a*), by way of example, the original energization duration of the heating resistor 6 is illustrated with the resistance curve according to FIG. 2. This energization duration is provided for the time period from $T_0$ to $T_1$ in FIG. 2. FIG. 3*b*) shows, for comparison and by way of example, an increased energization duration. The increased energization duration is provided after the time $T_1$ in FIG. 2 has been reached, that is to say when the threshold value $R_1$ has been exceeded. If the electric resistance R of the heating resistor 6 continues to rise, in particular the energization duration is also correspondingly increased further. As is likewise illustrated in FIG. 3, the voltage U and the current intensity I remain adjusted constantly to the value $U_1$ and $I_1$.

The control device 10 also has a memory 14, in which the respective threshold value $R_1$ is stored. An individual threshold value $R_1$ is stored in the memory 14 here and preferably for each of the heating resistors 6. The threshold value $R_1$ is in particular 1 to 20%, preferably 1 to 10%, particularly preferably 1 to 5%, higher than the initial value $R_0$ for the electric resistance R of the heating resistor 6. In the present case, the threshold value $R_1$ is 15% higher than the initial value $R_0$, as illustrated by way of example in FIG. 2.

In principle, the control device 10 can also be configured in such a way that the respective threshold value $R_1$ or is adapted, in particular raised, continuously or at time intervals, in particular at regular time intervals, starting from its initial value $R_1$, illustrated in FIG. 2 for the time $T_2$. The adapted threshold value then replaces the respective previous threshold value $R_1$ in the memory 14. However, here and preferably no adaptation of the threshold value $R_1$ is provided, instead the latter remains constant or unchanged at $R_1$, as FIG. 2 shows. Starting from the time $T_1$, at which the constant threshold value $R_1$ has been exceeded, the energization duration is adapted here and preferably always on the basis of the respectively determined electric resistance R of the heating resistor 6, i.e. the energization duration is changed with each newly determined value for the electric resistance.

The present invention, finally, also relates to a method for wear compensation of a label printer 2 which prints labels 3 by means of thermal printing, which method can preferably be carried out by using the previously described wear compensation device 1.

In the method as proposed, wear compensation is carried out via the control device 10 which activates the thermal head 4 for printing the respective label 3, by the electric resistance R of one or more heating resistors 6 of the thermal strip 5 of the thermal head 4 being monitored and, when a predefined threshold value $R_1$ for the electric resistance R is exceeded, the energization duration of the respective heating resistor 6 being increased during a printing operation.

The invention claimed is:

1. A wear compensation device for a label printer that includes a thermal head having a thermal strip provided with a plurality of heating resistors and a label feed device for feeding respective labels to an active region of the plurality of heating resistors and that prints labels by means of thermal printing in a printing operation, the wear compensation device comprising:

- a control device for activating the thermal head for printing the respective labels;
- wherein the control device is configured to monitor electric resistance of one or more of the plurality of heating resistors and, when it is determined that a predetermined threshold value for the electric resistance for a respective one or more of the plurality of heating resistors is exceeded, to increase energization duration for the respective one or more of the plurality of heating resistors during the printing operation.

2. The wear compensation device as claimed in claim 1, wherein the control device is configured to monitor the electric resistance of all the heating resistors of the thermal strip.

3. The wear compensation device as claimed in claim 1, wherein the control device is configured to monitor the electrical resistance of heating resistors of at least one predefined group of heating resistors of the thermal strip.

4. The wear compensation device as claimed in claim 1, wherein the control device is configured such that voltage and/or current intensity during the printing operation with the increased energization duration is not changed in comparison with at least a last preceding printing operation in which the predetermined threshold value was not determined to be exceeded.

5. The wear compensation device as claimed in claim 1, wherein the control device is configured to determine the electric resistance of the respective one or more of the plurality of heating resistors continuously.

6. The wear compensation device as claimed in claim 1, wherein the control device is configured to determine the electric resistance of the respective one or more of the plurality of heating resistors at time intervals.

7. The wear compensation device as claimed in claim 1, wherein the control device comprises a current measuring device for determining the electric resistance of the respective one or more of the plurality of heating resistors.

8. The wear compensation device as claimed in claim 1, wherein the control device comprises a voltage measuring device for determining the electric resistance of the respective one or more of the plurality of heating resistors.

9. The wear compensation device as claimed in claim 1, wherein the control device comprises a comparator for comparing the electric resistance determined for the respective one or more of the plurality of heating resistors with the predefined threshold value.

10. The wear compensation device as claimed in claim 1, wherein the control device is configured such that the control device adjusts the energization duration depending on the electric resistance determined for the respective one or more of the plurality of heating resistors such that the energization duration rises with increasing electric resistance.

11. The wear compensation device as claimed in claim 1, wherein the control device comprises a memory for storing the predetermined threshold value.

12. The wear compensation device as claimed in claim 11, wherein the memory is configured to store an individual predetermined threshold value for each of the one or more of the plurality of heating resistors being monitored.

13. The wear compensation device as claimed in claim 1, wherein the control device is configured such that the predetermined threshold value does not change as the thermal strip ages through use.

14. The wear compensation device as claimed in claim 1, wherein the control device is configured such that the predetermined threshold value is raised from an initial value to a subsequent value continuously as the thermal strip ages through use.

15. The wear compensation device as claimed in claim 1, wherein the control device is configured such that the predetermined threshold value is raised from an initial value to a subsequent value at time intervals as the thermal strip ages through use.

16. The wear compensation device as claimed in claim 1, wherein the control device is configured to fix the predetermined threshold value for the respective one or more of the plurality of heating resistors at an initial value when a new thermal strip is installed.

17. The wear compensation device as claimed in claim 1, wherein the initial value is 1 to 20% higher than an initial value for the electric resistance of the respective one or more of the plurality of heating resistors.

18. The wear compensation device as claimed in claim 1, wherein the initial value is 1 to 10% higher than an initial value for the electric resistance of the respective one or more of the plurality of heating resistors.

19. The wear compensation device as claimed in claim 1, wherein the initial value is 1 to 5% higher than an initial value for the electric resistance of the respective one or more of the plurality of heating resistors.

20. A method for wear compensation of a label printer that prints labels by means of thermal printing in a printing operation and includes a thermal head having a thermal strip provided with a plurality of heating resistors, a label feed device for feeding respective labels to an active region of the plurality of heating resistors and a control device for activating the thermal head for printing the respective labels, the method comprising monitoring electric resistance of one or more of the plurality of heating resistors using a wear compensation device as claimed in claim 13, and, when it is determined that a predefined threshold value for the electric resistance for a respective one or more of the plurality of heating resistors is exceeded, increasing energization duration for the respective one or more of the plurality of heating resistors during the printing operation.

* * * * *